Patented Dec. 27, 1949

2,492,938

UNITED STATES PATENT OFFICE 2,492,938

N-SUBSTITUTED CARBAMATES

Ronald Rosher, Wilmington, Del., assignor to Hercules Powder Company, Wilmington, Del., a corporation of Delaware No Drawing. Application October 30, 1948, Serial No. 57,625

20 Claims. (Cl. 260—100)

This invention relates to new carbamates and more particularly to N-substituted carbamates in which the N-substituent is the hydrocarbon radical of a stabilized rosin.

In accordance with this invention it has been found that carbamates containing a —CH$_2$R group attached to the nitrogen, where R is the hydrocarbon radical of a stabilized rosin acid, may be prepared by reacting the isocyanate of a stabilized rosin with an alcohol. These new N-substituted carbamates have been found to have unusual properties and provide an entirely new type of rosin derivative.

The following examples illustrate the preparation of the new N-substituted carbamates in accordance with this invention. All parts and percentages are by weight unless otherwise indicated.

Example 1

One hundred twenty parts of disproportionated or dehydrogenated rosin isocyanate of 86% purity (0.34 mole) and 11.6 parts of a high grade pentaerythritol (0.085 mole which is equivalent to 0.34 mole of hydroxyl) were agitated and heated at 200° C. for 24 hours. The resulting resin had a color of approximately 9 Amber (Lovibond), a drop softening point of 134° C., a molecular weight as determined in acetone of 914, per cent hydroxyl 0.5, and per cent isocyanate 0.24. This resin was soluble in a 1:1 ratio in benzene, acetone, n-butyl acetate and petroleum hydrocarbon solvents. It was insoluble in 1:1 and 1:3 ratios in ethanol and diethylene glycol.

Example 2

Example 1 was repeated except that the dehydrogenated rosin isocyanate was 100% pure and a technical grade of pentaerythritol was used. In this case, the reaction mixture was heated in an atmosphere of nitrogen. The resin so prepared had a color of approximately 60 Amber (Lovibond), a drop softening point of 140° C., molecular weight of 1055, per cent hydroxyl 0.69, and per cent isocyanate 0.07. The resin was soluble in a 1:1 ratio in benzene, acetone, and n-butyl acetate and insoluble in ethanol.

Example 3

Ninety parts of a 95.5% pure dehydrogenated rosin isocyanate (0.276 mole) and 10 parts of a technical grade pentaerythritol (0.276 mole hydroxyl) were stirred and heated at 200° C., the reaction being tested at periodical intervals to determine the rate at which the reaction occurred. The isocyanate concentration was 11.6% at the start of the reaction and after 1 hour at 200° C. the reaction mixture contained 0.24% isocyanate and at the end of 3 hours the isocyanate concentration had not changed. The reaction was, therefore, 98% complete at the end of 1 hour. The resin had a drop softening point of 152° C. and contained 0.46% hydroxyl.

Example 4

Dehydrogenated rosin isocyanate of 95.5% purity, 78.2 parts (0.24 mole), was mixed with 11.6 parts (0.32 mole hydroxyl) of technical pentaerythritol and the mixture was stirred and heated for 1 hour at 200°–210° C. The resin had a color of approximately 62 Amber (Lovibond), a drop softening point of 145° C., hydroxyl content of 1.68%, and an isocyanate content of 0.2%.

Example 5

One hundred parts of 95% dehydrogenated rosin isocyanate (0.303 mole), 9.5 parts of ethylene glycol (0.153 mole), and 0.5 part of tributylamine were stirred and heated for 6 hours at a temperature of 150°–160° C. The resulting resin was dissolved in 200 parts of benzene, extracted with 10% hydrochloric acid, and then washed with water until neutral. The benzene was then distilled off, the last traces being removed at a temperature of 125° C. at 15 mm. pressure. The resin so prepared had a color of approximately 10 Amber (Lovibond), a drop softening point of 97.0° C., molecular weight of 569 and contained 0.2% hydroxyl and 0.5% isocyanate. This resin was soluble in a 1:1 ratio in benzene, acetone, n-butyl acetate and/or a petroleum hydrocarbon solvent. It was insoluble in either 1:1 or 1:3 ratios in ethanol and diethylene glycol.

Example 6

A dehydrogenated rosin isocyanate of 100% purity, 104 parts (0.33 mole), was mixed with 10.1 parts of glycerine (0.11 mole) and the mixture was heated and stirred for 16 hours at 160° C. and then for 6 hours at 200° C. The resin so obtained had a color of approximately 40 Amber+8 Red (Lovibond), drop softening point of 130° C., molecular weight in acetone of 783, and contained 1.35% hydroxyl and 0.02% isocyanate. This resin was soluble in a 1:1 ratio in benzene, acetone, and n-butyl acetate. It was insoluble in ethanol and diethylene glycol.

Example 7

Sixty parts of an 86% dehydrogenated rosin isocyanate (0.17 mole) and 57 parts of an 87% hydroabietyl alcohol (0.17 mole) were stirred and heated at 200° C. for 24 hours. The resulting clear resin had a color of 28 Amber (Lovibond), drop softening point of 84° C., a molecular weight of 543, and contained 0.2% hydroxyl and 0.16% isocyanate. This resin was soluble in a 1:1 ratio in benzene, acetone, n-butyl acetate and a petroleum hydrocarbon solvent. It was insoluble in ethanol and diethylene glycol.

*Example 8*

Hydrogenated rosin isocyanate of 96% purity, 87.6 parts (0.268 mole), was mixed with 9.7 parts (0.268 mole hydroxyl) of technical pentaerythritol and the mixture was stirred and heated for 24 hours at 200° C. in an atmosphere of nitrogen. The resin had a drop softening point of 133° C., a color of 22.5 Amber (Lovibond), hydroxyl content of 0.32% and an isocyanate content of 0.25%. This resin was soluble in benzene, acetone, and n-butyl acetate and insoluble in ethanol.

*Example 9*

Three parts of dehydrogenated rosin isocyanate were dissolved in 20 parts of n-butanol. The mixture was then heated to the boiling point and the unreacted n-butanol distilled off, leaving a thick oil which crystallized on standing. The carbamate, after recrystallization from petroleum ether had a melting point of 65°–73° C. and contained 3.60% nitrogen (theory=3.63%).

An N-substituted carbamate containing the hydrocarbon radical of a stabilized rosin in accordance with this invention may be prepared by reacting a stabilized rosin isocyanate with an alcohol. By the term "stabilized rosin isocyanate" is meant the isocyanate of a stabilized rosin acid; i. e., those rosins having the hydrocarbon nucleus of dehydroabietic acid, dihydroabietic acid, tetrahydroabietic acid, polyabietic acid or the corresponding pimaric acid derivatives. The new N-substituted carbamates of this invention, therefore, may be defined as those in which the N-substituent is —CH₂R where R is the hydrocarbon radical of a stabilized rosin acid. Of particular importance are the N-substituted carbamates containing as the N-substituent a dehydro- or hydro- (i. e., di- or tetra-hydro) abietyl or pimaryl radical, which carbamates are prepared by reacting disproportionated or dehydrogenated rosin isocyanate, hydrogenated rosin isocyanate, etc., with an alcohol. They may also be prepared by reacting the pure isocyanates; namely, dehydroabietyl isocyanate, dihydroabietyl isocyanate, tetrahydroabietyl isocyanate, etc., with the alcohol instead of using the commercial rosin isocyanates.

Any alcohol may be reacted with the stabilized rosin isocyanates to prepare the N-substituted carbamates of this invention. The alcohol may be a monohydric or a polyhydric alcohol and is preferably a primary or secondary alcohol since tertiary alcohols react only with difficulty. Exemplary of the alcohols which may be used are aliphatic alcohols such as methanol, ethanol, propanol, isopropanol, butanol, isobutyl alcohol, lauryl alcohol, ethylene glycol, diethylene glycol, glycerol, trimethylolpropane, pentaerythritol, etc., aromatic alcohols such as phenol, cresol, p-xylyl alcohol, phenylethyl alcohol, etc., and such high molecular weight alcohols as hydroabietyl alcohol. The alcohols may also contain other functional groups as, for example, the amino alcohols such as alkyl ethanol amines, alkyl diethanol amines, ethanol dehydrogenated rosin amine, diethanol dehydrogenated rosin amine, etc. In general, a primary alcohol is preferred, although secondary alcohols are operable as may be seen from the foregoing examples. If resinous carbamates are desired the alcohol reacted with the stabilized rosin isocyanate should be a polyhydric alcohol or a monohydric alcohol of high molecular weight, such as hydroabietyl alcohol.

The N-substituted carbamates prepared by reacting the isocyanate of a stabilized rosin with an alcohol in accordance with this invention may be considered as having the general formula

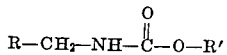

where R is the hydrocarbon radical of a stabilized rosin acid and R' is the alcohol radical. Thus, if the alcohol reacted with the stabilized rosin isocyanate is a monohydric alcohol, R' would be an alkyl, aralkyl, cycloalkyl, etc., radical depending upon the type of monohydric alcohol reacted. However, if the alcohol were a polyhydric alcohol, then R' might be a hydroxy-substituted radical, or a radical containing one or more of the N-substituted carbamate groups, depending upon how many of the hydroxy groups in the polyhydric alcohol reacted with the stabilized rosin isocyanate.

The rosin isocyanates, used to prepare the new carbamates in accordance with this invention, may be prepared by reacting the amine of a stabilized rosin or the hydrohalide salt thereof with phosgene. Any stabilized rosin amine may be used as, for example, dehydrogenated or disproportionated rosin amine, hydrogenated rosin amine, polymerized rosin amine, etc. Instead of the commercial rosin amines, the pure compounds may be reacted as, for example, dehydroabietyl amine, hydroabietyl amine, etc., in which case a pure isocyanate is obtained. The rosin isocyanates are readily prepared by passing phosgene into a solution of rosin amine or the hydrohalide salt thereof in an inert solvent such as petroleum hydrocarbons, aromatic hydrocarbons, and halogenated hydrocarbons, at a temperature of from about 50° C. to about 200° C. The isocyanate may then be separated from the reaction mixture by removal of the solvent and distillation of the residue. These isocyanates are pale yellow to colorless, viscous liquids which may be distilled at subatmospheric pressures.

The reaction between the isocyanate of a stabilized rosin and the alcohol to prepare the N-substituted carbamates of this invention is readily carried out by simply heating the rosin isocyanate with the alcohol. The reaction may be carried out in the presence or absence of a solvent. When the reaction with a lower molecular weight monohydric alcohol is carried out a solvent may be desired or an excess of the alcohol may be used as the reaction medium. Solvents which may be used in carrying out the reaction are the aromatic hydrocarbons such as benzene, toluene, etc., esters such as ethyl acetate, butyl acetate, etc., ketones, ethers, and chlorinated hydrocarbons. The temperature at which the reaction is carried out will depend upon the reaction conditions. For example, when a solvent is used a relatively low temperature is sufficient for carrying out the reaction. On the other hand, when no solvent is used the reaction is usually carried out at a temperature which is above the softening point of the resin, which temperature may be from 50° to 100° C. above that point. In general, a temperature of from about 60° C. to about 250° C. and more preferably from about 75° C. to about 200° C. is used. In the case of some of the lower monohydric alcohols, it may be desirable to carry out the reaction under pressure in order that a suitable temperature may be reached for the formation of the carbamate. When the rosin isocyanate and the alcohol are reacted at a high temperature the reaction appears to be so rapid that no catalyst is necessary. However, catalysts such as the tertiary amines may be used for speeding up the reaction and may be desirable when the reaction is carried out at lower temperatures. If the reaction is carried out in the absence of a solvent the N-substituted carbamate is obtained as the only product but when a solvent is used the carbamate is isolated by distillation of the solvent medium.

In preparing the N-substituted carbamates of this invention equal molar quantities of the rosin isocyanate and alcohol may be used and such a ratio of reactants is desirable when the rosin isocyanate is reacted with a monohydric alcohol. However, when the reaction of the rosin isocyanate is carried out with a polyhydric alcohol a sufficient amount of the rosin isocyanate may be added to react with each of the hydroxyls of the polyhydric alcohol or only enough to react with one of the hydroxyls may be used. In the latter case, the N-substituted carbamate product resin would then have a free hydroxyl group. For example, the product prepared with ethylene glycol might have one or two carbamate groups and in a product such as pentaerythritol anywhere from one to four carbamate groups may be introduced into the molecule.

The resins prepared by the interaction of a stabilized rosin isocyanate on a polyhydric alcohol or a high molecular weight monohydric alcohol are light in color, particularly if air is eliminated during the heating period. The drop softening point of the resin will depend upon the number of carbamate groups introduced into the polyhydric alcohol if such alcohol is used, and also will vary with the purity of the starting materials. These resinous materials have high molecular weights but, in spite of the molecular weight, they all have the same solubility characteristics in that they are soluble in aromatic hydrocarbons, ketone solvents, esters, etc., and are insoluble in alcohol.

The N-substituted carbamates containing a dehydroabietyl or hydroabietyl radical prepared by the reaction of a rosin isocyanate with an alcohol in accordance with this invention are of particular interest in that they have softening points higher than the esters formed by the action of the corresponding rosin acid with the corresponding alcohol. These products differ from the rosin esters in that they contain carbamate linkages in place of such ester linkages. In addition to the fact that these carbamates have higher softening points than the corresponding rosin esters, they also have the advantage of having a lower acid number since they are prepared from the isocyanate and the reaction is practically complete whereas in the case of rosin esters the product always has a relatively high acid number due to the incomplete esterification of the rosin acid.

The new N-substituted carbamates containing as the N-substituent the hydrocarbon radical of a stabilized rosin have many important uses, particularly in protective coatings. Some of the resins prepared from the stabilized rosin isocyanates and polyhydric alcohols as, for example, the resin prepared from one mole of pentaerythritol and three moles of dehydrogenated rosin isoycanate are compatible with nitrocellulose and are, therefore, of value in lacquer formulations. Other of these new carbamate resins such as those prepared from the stabilized rosin isocyanates and either polyhydric alcohols or high molecular weight monohydric alcohols are of outstanding value in the preparation of varnishes and are superior to other rosin-type resins in this use. Especially important is the preparation of cold-blended varnishes from these resins, particularly from the carbamate resin prepared from pentaerythritol and dehydrogenated rosin isocyanates. In the past, it has not been possible to prepare cold-cut varnishes which were comparable to cooked varnishes. They lacked the degree of viscosity which would allow the use of large amounts of the relatively inexpensive thinners such as are used in cooked varnishes. One of the great disadvantages of these cold-cut varnishes was their very slow drying rates and they also had poor gloss and low alkali- and water-resistance. In contrast, the resinous pentaerythritol ester of dehydroabietyl N-substituted carbamic acid can be cold-blended into drying oils to produce varnish vehicles which are not only better than any previous cold-blended varnish but which are comparable to the standard cooked varnishes. The cold-cut varnishes prepared from this resin are fast drying, have a high degree of viscosity so that large amounts of thinners may be added and are resistant to water and alkali. Varnishes produced from these resins may be pigmented without reaction with the pigment occurring and consequently are free from livering, etc. Thus, it may be seen that the N-substituted carbamates of this invention have unique properties and, consequently, have many important industrial applications.

In the copending application of David S. Breslow, Serial No. 66,842, filed December 22, 1948, the reaction of the isocyanate of a stabilized rosin acid with cellulose is described.

What I claim and desire to protect by Letters Patent is:

1. An N-substituted carbamate in which the N-substituent is—$CH_2R$ where R is the hydrocarbon radical of a stabilized rosin acid and is attached to the $CH_2$ group through the 1-position.

2. An N-substituted carbamate of a monohydric alcohol in which the N-substituent is —$CH_2R$ where R is the hydrocarbon radical of a stabilized rosin acid and is attached to the $CH_2$ group through the 1-position.

3. An N-substituted carbamate of a polyhydric alcohol in which the N-substituent is —$CH_2R$ where R is the hydrocarbon radical of a stabilized rosin acid and is attached to the $CH_2$ group through the 1-position.

4. An N-dehydroabietyl carbamate.

5. A monohydric alcohol ester of N-dehydroabietyl carbamic acid.

6. A polyhydric alcohol ester of N-dehydroabietyl carbamic acid.

7. The hydroabietyl alcohol ester of N-dehydroabietyl carbamic acid.

8. An ethylene glycol ester of N-dehydroabietyl carbamic acid.

9. A pentaerythritol ester of N-dehydroabietyl carbamic acid in which from 1 to 4 of the hydroxyl groups of pentaerythritol have been esterified by the carbamic acid.

10. The completely esterified ester of pentaerythritol and N-dehydroabietyl carbamic acid.

11. The process of preparing an N-substituted carbamate, in which the N-substituent is —CH$_2$R where R is the hydrocarbon radical of a stabilized rosin acid and is attached to the CH$_2$ group through the 1-position, which comprises reacting the isocyanate of a stabilized rosin with an alcohol.

12. The process of preparing an N-substituted carbamate, in which the N-substituent is —CH$_2$R where R is the hydrocarbon radical of a stabilized rosin acid and is attached to the CH$_2$ group through the 1-position, which comprises reacting the isocyanate of a stabilized rosin with a monohydric alcohol.

13. The process of preparing an N-substituted carbamate, in which the N-substituent is —CH$_2$R where R is the hydrocarbon radical of a stabilized rosin acid and is attached to the CH$_2$ group through the 1-position, which comprises reacting the isocyanate of a stabilized rosin with a polyhydric alcohol.

14. The process of preparing an N-dehydroabietyl carbamate which comprises reacting the isocyanate of dehydrogenated rosin with an alcohol.

15. The process of preparing an N-dehydroabietyl carbamate which comprises reacting the isocyanate of dehydrogenated rosin with a monohydric alcohol.

16. The process of preparing an N-dehydroabietyl carbamate which comprises reacting the isocyanate of dehydrogenated rosin with a polyhydric alcohol.

17. The process of preparing an N-dehydroabietyl carbamate which comprises reacting the isocyanate of dehydrogenated rosin with hydroabietyl alcohol.

18. The process of preparing an N-dehydroabietyl carbamate which comprises reacting the isocyanate of dehydrogenated rosin with ethylene glycol.

19. The process of preparing an N-dehydroabietyl carbamate which comprises reacting the isocyanate of dehydrogenated rosin with pentaerythritol.

20. The process of preparing a pentaerythritol ester of N-dehydroabietyl carbamic acid which comprises heating from 1 to 4 moles of dehydroabietyl isocyanate with a mole of pentaerythritol.

RONALD ROSHER.

No references cited.